United States Patent Office 3,148,026
Patented Sept. 8, 1964

3,148,026
TREATMENT OF SILICEOUS PIGMENT
Gerd Roderburg, Bad Godesberg, Germany, assignor to Deutsche Gold- und Silber-Scheideanstalt vormals Roessler, Frankfurt am Main, Germany, a corporation of Germany
No Drawing. Filed May 23, 1961, Ser. No. 111,904
Claims priority, application Germany May 25, 1960
8 Claims. (Cl. 23—182)

This invention relates to the thermal treatment of hydrated silica for the purpose of improving its dispersion characteristics as well as other properties.

Siliceous pigments obtained from the precipitation of a soluble silicate, as for example described in United States Patent No. 2,940,830, desirably have an average ultimate particle size of from about 10 to about 50 millimicrons as determined from electron microscopes, and a surface area of from about 50 to about 300 square meters per gram (determined by the Brunauer-Emmett-Teller Method, "Journal of the American Chemical Society," volume 60, page 309 (1938)). As a rule, these hydrated pigments contain bound water in the proportion of about 3 to 9 moles of $SiO_2$ per mole of bound water and from about 2 to 10 percent by weight of the pigment of free water. Bound water and free water are defined in the above patent. It has been found that when these materials are dehydrated, that is, the free and bound water are essentially removed, the siliceous pigment operates desirably as a filler in the manufacture of greases, paints, varnish and thermosetting or thermoplastic polymers.

The art describes various methods for dehydrating these siliceous pigments (hydrated silica and silicates). One such technique comprises a thermal treatment for about one-half to one hour or more at a temperature of 150° to approximately 900° C., generally not higher than 700° C. because of detrimental effects caused by impurities in the pigment. To effectively operate this type of thermal treatment it is necessary that the siliceous pigment be extremely pure. Because of the unstable crystal structure of the aforementioned precipitated siliceous materials, this type of thermal treatment results in the formation of pigment agglomerates. A similar type of treatment suggested involves the addition of nitrogen-containing organic compounds, for example, amines, their salts, or quaternary ammonium salts to the surface of the pigment, followed by the aforementioned thermal treatment. This technique does not eliminate the above noted disadvantages.

It has been found that the difficulties encountered in previous dehydration technique can be obviated by the simple and efficient process of this invention. It has been found that when a finely-divided hydrated siliceous pigment is coated with an organic nitrogen compound and thermally treated in a particular manner, a dehydrated siliceous pigment results having desirable filler characteristics, especially in the manufacture of greases, paints, varnishes and polymers. The process involves the coating of the siliceous pigment with an organic nitrogen compound, drying the coated material and then heating the siliceous material to a temperature equivalent to or greater than the inflammation point of the organic nitrogen-containing compound. This part of the thermal treatment is effected in the presence of free oxygen. The nitrogen-containing organic coating is explosively burned within a period of not more than two seconds, preferably less than one second, from the start of the thermal treatment. After this part of the thermal treatment, the siliceous pigment is subjected to an additional thermal treatment at about 600° to 800° C. for a short period of time, generally less than one minute to less than 25 seconds, preferably from 4 to 10 seconds, in an air atmosphere.

The siliceous pigmentary material which may be treated in accordance with the process of this invention can be any hydrated variety, preferably one produced by the precipitation of a soluble silicate from an aqueous solution. The siliceous pigment, prior to being coated with the organo nitrogen compound, may be dried so that it contains only its moisture equilibrium amount of free and bound water, or may be in the form of a slurry or paste (aqueous or solvent). For example, it has been found most desirable to utilize a washed filter cake of the precipitated siliceous pigment as the starting siliceous material. Hence, it is not necessary to start with a dry pigment as described above, though it is clear that such a dry siliceous material may be effectively employed.

The usable organic nitrogen compounds are primary, secondary and tertiary amines, their salts, preferably long-chained aliphatic amines containing more than 8 carbon atoms, quaternary ammonium hydroxides and salts, and fatty acid amides, preferably those fatty acid carboxamides containing from 8 to 22 carbon atoms, long-chained amino carboxylic acids, amino sulfonic acids, and long-chained amino alcohols. Examples of usable organic nitrogen compounds are cetyltrimethylammoniumbromide, cetyltrimethylammonimchloride, N-dodecyl-beta-aminobutyric acid (N-coco-beta-butyric acid), n-octylamine, n-dodecylamine or Armeen C (sold by Armour and Company), a mixture of said long-chain alkyl amines, di-decylamine, di-tetradecylamine, di-octadecylamine or their mixtures, tri-decylamine, tri-octadecylamine, tri-octadecenylamine, octadecyl-trimethylammoniumbromide, hexadecyl-trimethylammoniumbromide, dodecyl-pyridiniumbromide, N-octadecyl-pyridiniumchloride, N-dodecyl-beta-aminopropionic acid, N-cetyl-gamma-aminobutyric acid, omega-aminododecanol, omega-aminodecanol and 8-aminononanol. The organic nitrogen-containing compound may be coated on the siliceous pigment in amounts of from one to 10 percent by weight of the siliceous material (dry weight basis), preferably from 2 to 5 percent by weight.

The coated siliceous material noted above, preferably in powdered form, is then heated in the presence of free oxygen to the inflammation point of the organic nitrogen-containing compound. The amount of oxygen is adjusted to correspond with the amount of coating placed on the material so that the combustion takes place completely within two seconds, preferably one second or less.

As a rule, oxygen is introduced to the coated siliceous pigment in admixture with air, such as an air-oxygen mixture having an oxygen content exceeding 21 percent by volume to 50 and more percent by volume, basis volume of mixture. Very satisfactory results have been found when a gas mixture of oxygen and air contained about one part by volume of oxygen to 3 parts by volume of air. Preferably, one liter of this gas mixture is employed for each gram of the siliceous material to be treated.

To achieve the desired dehydration, the coated siliceous material is heated while in contact with oxygen to a temperature of from about 600° to 800° C., preferably 600° to 750° C., usually around 700° C. The heating is preferably accomplished by the employment of indirect heating means, for example, an electric coil wound around the vessel in which the combustion takes place. The thermal treatment is desirably carried out in a continuous manner. For example, the process can be effected in a rotary kiln wherein the oxygen and air mixture and the coated siliceous pigment is introduced at a heated end of the kiln and the final product withdrawn from the other end.

As a result of the treatment of this invention, the total detectable free and bound water content of the hydrated siliceous pigment is removed. When a siliceous pigment treated according to this invention is left standing in air at room temperatures, viz., 20° C., a state of equilibrium with moisture in the air is established. This moisture adsorbing pigment thermally treated in a muffle furnace at a temperature of about 1000° C. for a period of one hour shows a total loss of weight of up to 2 to no more than 3 percent.

Furthermore, the siliceous pigment produced according to the process of this invention is found to be less aggregative than siliceous pigments thermally treated by other techniques. In addition, the siliceous pigment treated according to the process of this invention shows a reduction on the order of ⅓ in its volumetric weight. Thus, the treated siliceous pigments of this invention show a higher degree of dispersion in oils or paints. For example, grinding tests in paraffin oil have shown that the siliceous pigments produced by the process of this invention become transparent after 200 revolutions in a Hoover Automatic Muller, whereas coated siliceous pigments thermally treated according to the prior art methods discussed above become transparent after 600 revolutions.

*Example I*

A hydrated silica pigment filter cake produced by the precipitation of sodium silicate from an aqueous solution was thoroughly washed and peptized with an aqueous 1 percent acetic acid solution under shearing stress. The hydrated silica was evenly spray coated with 5 percent by weight of N-dodecyl-beta-aminobutyric acid (N-coco-beta-butyric acid), basis weight of the pigment. The coated material was dried at room temperature and ground to a fine powder. This powder was introduced into a vertically disposed quartz tube electrically externally heated. The tube was of a spiral design approximately 34 feet long with an inner diameter of 25 millimeters. The siliceous pigment powder was introduced to the bottom of the tube by means of a vibratory sieve and held in suspension by passing an air-oxygen mixture to the bottom of the tube. For each gram of siliceous powdery material introduced to the bottom of the tube there was concurrently introduced at the same point of the tube one liter of a gas mixture consisting of 15 liters of air and 5 liters of oxygen. The temperature at the middle of the tube is 650° C. The powder suspension remains in the tube for 7 to 8 seconds. On initial entry of the powder and gas mixture to the tube the dodecyl-beta-amino-butyric acid burned explosively. At this initial point of entry the temperature of the tube is about 650° C. The silica pigment removed from the tube was separated from the gases in a cyclone separator. The siliceous pigment produced was free from detectable water, either free or bound.

Although the present invention has been described in detail as to particular embodiments thereof, it is not intended that these details shall limit the scope of the invention except insofar as included in the accompanying claims.

I claim:
1. In the process of removing free and bound water from a hydrated siliceous pigment, the improvement which comprises coating the siliceous pigment with an organic nitrogen-containing compound, heating the coated pigment in the presence of free oxygen to a temperature equivalent to at least the inflammation point of the organic nitrogen compound, adjusting the amount of free oxygen to correspond with the amount of said coating whereby to permit complete combustion of the coating within 2 seconds, explosively burning the coating completely within 2 seconds and thereafter subjecting the resulting pigment to a 600° C. to 800° C. heat treatment in an air atmosphere for a period of time not exceeding 60 seconds.

2. The process of claim 1 wherein the continued heat treatment is effected within 4 to 10 seconds.

3. The process of claim 1 wherein the coating is effected on a washed filter cake of the siliceous pigment.

4. In the process of removing free and bound water from a hydrated siliceous pigment, the improvement which comprises coating the siliceous pigment with an organic nitrogen-containing compound from the group consisting of amines containing more than 8 carbon atoms, organic quaternary ammonium compounds, organocarboxamides containing from 8 to 22 carbon atoms and salts of these compounds, heating the coated pigment in the presence of free oxygen in an amount corresponding with the amount of organic coating sufficient to permit complete combustion thereof within 2 seconds to the inflammation point of the organic nitrogen compound, explosively burning the organic coating completely within 1 second and thereafter subjecting the resulting pigment to thermal treatment at 600° C. to 800° C. in an air atmosphere for 4 to 10 seconds.

5. The process of claim 4 wherein the organic nitrogen-containing compound is N-dodecyl-beta-aminobutyric acid.

6. The process of claim 4 wherein the amount of said organic nitrogen-containing coating is from 1 to 10 percent by weight of siliceous pigment on a dry weight basis.

7. The method of claim 4 wherein the coated pigment is dried after the coating step but before it is heated to the inflammation point.

8. In the process of removing free and bound water from a hydrated siliceous pigment, the improvement which comprises coating the siliceous pigment with a small amount of an organic nitrogen-containing compound, heating the coated pigment in the presence of sufficient free oxygen to the inflammation point of the organic nitrogen compound, providing sufficient amount of said oxygen to permit complete combustion of said organic nitrogen coating within 2 seconds of attaining the said inflammation point temperature, explosively burning the organic coating completely within 2 seconds of the time that said mixture is subjected to the thermal treatment, and subjecting the resulting pigment to a thermal treatment at from 600° C. to 800° C. in an air atmosphere for a period of time not exceeding 60 seconds.

References Cited in the file of this patent

UNITED STATES PATENTS

| | | |
|---|---|---|
| 1,813,272 | Biltz | July 7, 1931 |
| 2,490,260 | Ehrhardt | Dec. 6, 1949 |
| 2,532,497 | Hoekstra | Dec. 5, 1950 |
| 2,643,231 | Erickson | June 23, 1953 |
| 2,740,726 | Anderson | Apr. 3, 1956 |
| 2,875,159 | Erickson | Feb. 24, 1959 |
| 3,013,897 | Cupery et al. | Dec. 19, 1961 |